9059X

W. Mathews.

Rice Cleaning.

Patented Aug. 27, 1835.

1902

9059 X Aug 27 1835

William Mathews of Charleston South Carolina

Letters Patent

The Schedule referred to in these Letters Patent and making part of the same containing a description in the words of the said William Mathews himself of his improvement in the machine for Threshing Rice or any other small grain To all whom these presents shall come.. Be it known that I William Mathews of Charleston in the District of Charleston and State of South Carolina, have invented a new and useful improvement in the machine for threshing Rice or any other small grain. and that the following is a full and exact description of the construction and operation of the said machine as invented or improved by me. The method of construction will be best understood by reference to the annexed drawings, in which the letter A represents ~~the frame~~ which is of an oblong shape and enclosed. A^1^ The top piece of this frame upon which is supported a beating cylinder B. which may be made either with stationary Beaters having pins or teeth along the outer edge of each Bar of an oblong shape say abt half an inch by three quarters. or the beaters may be of that kind called hinge beaters. which have already been used and are moveable upon a bar passing from head to head of said cylinder and forming partial revolutions thereon. pins or teeth being used on the outer edge; The letter C represents these beaters. D. is the bed of these beaters and forms the concave in which they revolve. The surface of this bed is cut into angular projections E. fortified by the application of a strip of sheet iron along the angle. These angles are opposed to the direction of the revolution of the beaters. F is a small pulley of abt. one inch and a half in diam. on the end of the axis of the beating cylinder. on the other end is a small spur wheel of eight teeth or cogs at G. and this is the driving end, and instead of a pulley which is apt to slip. and does not give a sufficiently steady and continuous motion. I use a small cross shaft H let on to the said axis by a square hole into a cross. which shaft is applied the fixture from the driving power. The cog wheel G works into a larger one I. of twenty nine teeth which is fastened on to the end of the feeding Roller J. which revolves between the upright bars K which are connected at the bottom and run forward in front of the feeding

Figure 1:
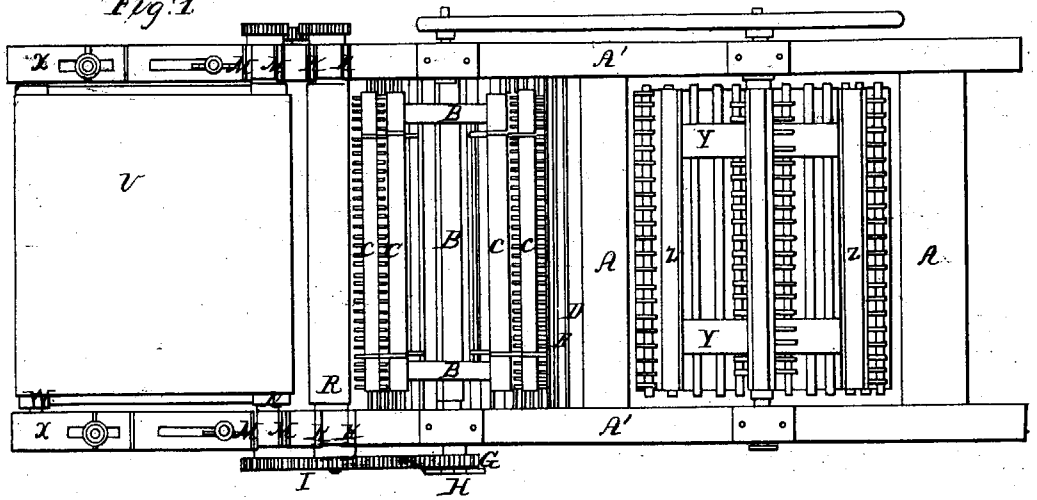
Figure 2:
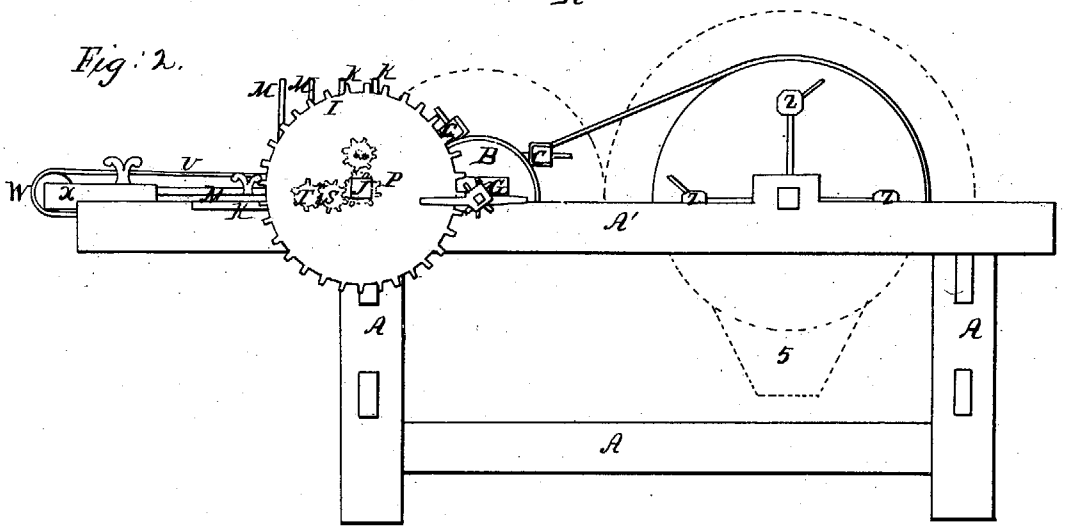

9059X roller as is shown in fig 1. where there is a cut groove L. in the said projection for
the purpose of adjusting the other pair of upright connected bars M in which the
roller of the feeding table N. nearest the feeding rollers turns. a groove being also
cut therein so that by loosening the screw O the rollers N. may be set nearer to
the feeding rollers at pleasure. The method I prefer of keeping this feeding roll-
er down to the proper pressure is by means of the lever and weight. To the oth-
er end of the lower feeding roller J. is secured a small spur wheel P. of eight teeth
working into another Q. on the top one of the like number of teeth which produ-
ces the reverse motion in the top feeding roller R. The lower feeding roller J also
turns a small connecting spur wheel S. which drives another T. each having
eight teeth and that one marked T is secured to the end of the feeding table roll-
er N thereby giving it the same motion as the lower J and consequently brings
forward the feeding cloth U. which is kept stretched by means of the tighten-
ing Roller W. which can be set further off by means of the thumb screw and
groove in the piece X at the other end of the frame and behind the beating
cylinder B. is placed another cylinder or revolving comb Y consisting of arms
through the axis supporting bars along this axis armed with long teeth there-
by forming combs Z which teeth are set so as when they begin to descend into their
concave bed they assume a horizontal position. The axis of this cylinder or comb
carries a pulley of about five inches in diam (3) on the same side of the frame
as the pully on the beating cylinder. and is driven by said beater pulley and
a belt. The bed of this cylinder is composed of bars, 4. set at such a distance
apart as to let the grain fall through into a kind of hopper, 5 beneath. when I
sometimes apply a common fan to clear the rice or grain from what chaff
may remain. but generally the comb carries all off leaving the grain sufficient-
ly clean. covers are adapted to both cylinders Operation. The straw containing the grain is spread upon the feeding table
and by the motion communicated from the beating cylinder B to the roller thereof
next the feeder. The cloth is set revolving over its two rollers and carries the
grain and straw forward between the feeding Rollers J & R where it is caught
by the teeth of the beaters and driven over the concave bed D, which breaks
out the grain and throws all over to the bed of bars under the comb Z. here
the grains fall through, and the straw is driven to the back over the frame being

9059X separated from the grain. What I claim as my invention in the above descri
bed machine and not heretofore known is first the plan of setting the forward feeding
table Roller nearer to or farther from the feeding rollers as the length or strength
of straw may require according to the arrangements I have set forth of the connec
ted upright bars and grooves sliding upon the thumb screws. Second the applica
tion of the cog wheel gearing according to the plan and proportions set forth fo
driving the feeding Rollers. Third. the application of a beating cylinder eith
with stationary bars and square, or rather oblong teeth (or with the hinge beat
ers though I do not claim the invention thereof) to a concave bed as described
above though I do not claim said form of bed as my invention. Fourth. the
application of the comb driven as above set forth and over the bed above de
scribed, though I do not claim the invention of said comb and bed. The
machine above described has been fully tested as to its efficiency and prac
ticability. and has been decidedly approved of as by far the best combination
for the planter or grower of rice or any other small grain. that has been hereto
fore devised for their use whether taking into consideration the ease and cheap
ness of construction, the facility with which any repairs can be made as above
all the great perfection with which the work is executed. In testimony that
the above is is a full clear and exact description of the construction and use
or mode of operation of my machine as invented or improved by me. I have her
unto set my hand this thirteenth day of July eighteen hundred & thirty five Witnesses
Henry Stone
Robt. Clarke.

William Mathews

[illegible]